United States Patent [19]

Hussey et al.

[11] 4,117,383
[45] Sep. 26, 1978

[54] ELECTRICAL CONTROL CIRCUITS

[75] Inventors: Dennis Malcolm Hussey; William Martin John Coleman, both of Ross-on-Wye, England

[73] Assignee: The Haigh Engineering Company Limited, Ross-on-Wye, England

[21] Appl. No.: 789,251

[22] Filed: Apr. 20, 1977

[30] Foreign Application Priority Data

Apr. 27, 1976 [GB] United Kingdom ............... 16987/76

[51] Int. Cl.² ............................................. H02P 1/40
[52] U.S. Cl. .................................. 318/206 A; 318/283
[58] Field of Search ............... 318/206 A, 206 R, 281, 318/283, 291, 300, 207 A, 207 R

[56] References Cited

U.S. PATENT DOCUMENTS

| 2,701,855 | 2/1955 | Hammes | 318/283 X |
| 2,851,646 | 9/1958 | Williamson et al. | 318/283 X |

*Primary Examiner*—Herman J. Hohauser
*Attorney, Agent, or Firm*—Wellington M. Manning, Jr.; Luke J. Wilburn, Jr.

[57] ABSTRACT

An electrical control circuit for a single phase induction motor which uses relay operated reversing contacts to ensure that the motor reverses its direction of rotation upon each energization thereof.

2 Claims, 1 Drawing Figure

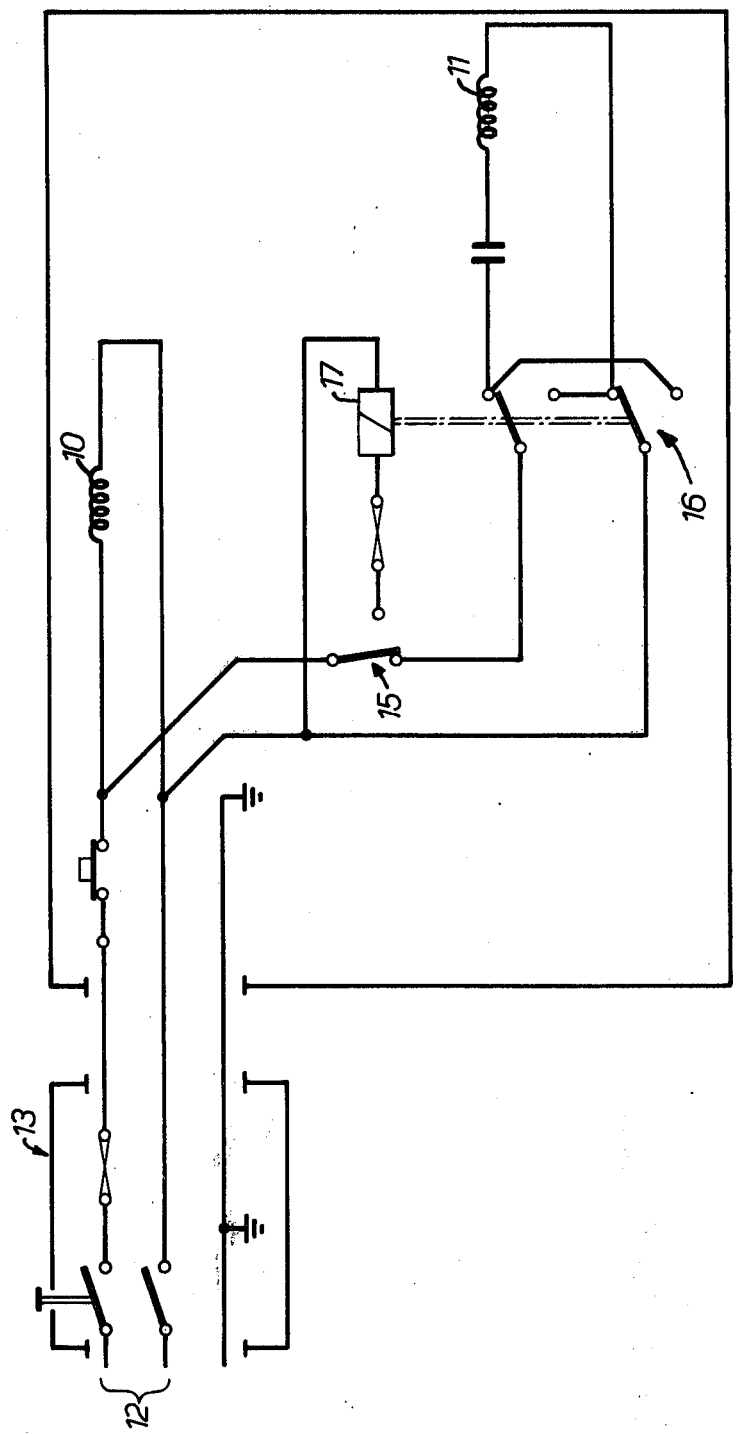

ELECTRICAL CONTROL CIRCUITS

This invention is concerned with a control circuit for electric motors.

The present invention is a control circuit for a single phase induction motor having a starting winding and a main winding, the supply to the starting winding being connected through a centrifugal switch and reversing contacts, said reversing contacts, after each starting sequence, being reversed so that the next start of the motor will produce reverse rotation thereof.

An embodiment of the present invention will now be described, by way of example, with reference to the accompanying drawing, the single FIGURE of which is a circuit diagram of a control circuit according to the present invention.

Referring now to the drawing, a single phase induction motor has a main winding 10 and, as is well known, a starting winding 11. The main winding 10 is connected to a single phase supply 12 through a controller switch 13.

The starting winding 11 is connected to the single phase supply 12 in parallel with the main winding 10 and through a first position of a centrifugal switch 15 and reversing contacts 16. The contacts 16 are operated by an impulse relay 17 which is energised by the centrifugal switch 15 in a second position.

In operation, considering the circuit to be as illustrated, the motor will start and run in say its forward direction. Upon reaching a specific speed, the centrifugal switch will operate to de-energise the starting winding allowing the motor to continue to run in its forward direction. As the centrifugal switch 15 is operated, it energises the switching relay 17 which changes over its contacts. In due course, the motor may be stopped by operation of the controller switch 13.

The next time the motor is operated, it will start in the reverse direction because the contacts 16 of the relay are now in their reversed position thus reversing the supply to the starting coil 11. Again, however, when the motor reaches the specified speed, the centrifugal switch 15 will be operated to disconnect the starting coil 11, allowing the motor to continue running in the reverse direction on the main winding 10, and energising the impulse relay to again change over the contacts 16 to bring them back to their original condition.

Thus the motor will, on alternate starts, run in the opposite direction.

A further advantage of the invention is that jamming of the motor or whatever is driven by the motor will cause the motor to reverse. This is particularly advantageous when the motor is the drive motor of a waste disposal unit as then a foreign body in the grinding chamber causing a jam also causes reversal of the motor which is often sufficient to free the obstruction.

We claim:

1. In combination with a single phase induction motor having a starting winding and a main winding, a motor reversing control circuit comprising:
   (a) a set of reversing contacts electrically connected to the starting winding of the motor, certain of said contacts causing motor operation in a forward direction and certain other of said contacts causing motor operation in a reverse direction;
   (b) an impulse relay connected to said reversing contacts and operable to alternately reverse said contacts; and
   (c) a centrifugal switch connectable in a first position between said set of reversing contacts and a source of power and in a second position between said relay and a source of power, whereby at a predetermined motor speed the centrifugal switch moves from its first position to its second position to de-energize the starting winding and energize the impulse relay whereby the contacts are reversed for reversal of the motor at the next energization of same.

2. A control circuit as claimed in claim 1, further in combination with a waste disposal unit coupled to said motor.

* * * * *